UNITED STATES PATENT OFFICE.

JOSEPH PORZEL, OF BUFFALO, NEW YORK, ASSIGNOR, BY MESNE ASSIGNMENTS, TO SUPERIOR RUBBER COMPANY, OF PITTSBURGH, PENNSYLVANIA, A CORPORATION OF PENNSYLVANIA.

PROCESS OF TREATING RUBBER.

1,374,231.     Specification of Letters Patent.     Patented Apr. 12, 1921.

No Drawing. Application filed August 7, 1918, Serial No. 248,700. Renewed October 9, 1920. Serial No. 415,950.

*To all whom it may concern:*

Be it known that I, JOSEPH PORZEL, a citizen of the United States, residing at Buffalo, in the county of Erie and State of New York, have invented certain new and useful Improvements in Processes of Treating Rubber, of which the following is a specification.

This invention relates to a process of treating rubber. It is to be distinguished from so-called processes of reclaiming rubber, and also is to be distinguished from methods of mere admixture of old, vulcanized rubber with a sufficient amount of new rubber to produce an article wherein the new rubber mixed with the old rubber produces in some degree the characteristics of newly vulcanized rubber, due to the presence of a large percentage of new rubber.

The essence of my invention resides in the discovery that if vulcanized rubber, which is old or has lost its desirable qualities, is reduced practically to the limit of mechanical division, under conditions where the freshly exposed surfaces are kept from exposure to oxygen or other elements which deteriorate such surfaces, and if then or thereafter a very small amount of new, unvulcanized rubber, dissolved in a large amount of solvent, is carried over such freshly exposed surfaces, the solvent then removed, and the thus coated or filmed particles subjected to ordinary methods of formation and vulcanization, a substance will result which has very nearly the characteristics and values of the original rubber when first formed and vulcanized.

While I do not assert positively as to what occurs, it is my belief that, while the grinding of the old rubber may, in some small measure, restore its activity, the valuable condition created is due to filming or coating the minute particles of old rubber with a very thin film of new rubber which, after vulcanization, gives to the product very nearly the qualities of the old rubber when the same was new and not deteriorated. Moreover, it is a condition other than that of a mere admixture of old rubber with new rubber wherein the beneficial qualities are due solely to the large amount of new rubber while the old rubber remains substantially in an inert state, for the obvious reason that I employ so small a percentage of new rubber that it, acting alone and the old rubber acting merely as an inactive mass or filler, could not produce the conditions of resiliency, elasticity and other qualities of good rubber which I attain.

The object of my invention is, therefore, to restore to vulcanized rubber which has lost in a greater or less degree its valuable qualities, its original qualities as nearly as possible in a simple and effective manner; and I will now describe the simplest method of carrying out my invention.

The old rubber having been cleaned and freed from metallic and other foreign substances sufficiently to permit of comminution, is then ground to a powder, practically to the limit of mechanical division, and under conditions where air and other deleterious gases are prevented from attacking the freshly exposed surfaces so far as is possible.

The next step is to mix such comminuted old rubber with a solution of new, unvulcanized rubber and a rubber solvent, which I shall hereafter term a solvent-cement. This solvent-cement consists of a very small amount of new rubber, as small as two pounds to one hundred pounds of comminuted, old rubber in some cases, and an excess of rubber solvent sufficient in quantity to carry the new rubber over substantially all of the newly exposed surfaces, e. g. about a pint of solvent to an ounce of new rubber. I may use any well-known solvent, but name carbon tetrachlorid or gasolene as those especially desirable,—the former being particularly so from the point of view of reduction of fire risk.

The mixing being completed by any well-known means, the solvent is then driven off, leaving the particles of old rubber filmed with the new rubber. In this state the product is a comparatively dry powder, and is not readily attacked by the oxygen of air.

The next step is to form and vulcanize by well-known means. Under ordinary conditions the old, vulcanized rubber contains a sufficient amount of free sulfur to effect the vulcanization of the very thin film of new rubber; but if the process is applied to desulfurized rubber or to rubber which contains an insufficient amount of sulfur, a sufficient amount of sulfur may be added with the solvent-cement. The amount of sulfur to be added under such circumstances will be determined readily by one skilled in the art.

The process may be varied somewhat; and I will now state two variations which may be employed. First, the old rubber may be ground to a condition somewhat less than its final comminution and ground dry as above indicated. Then the solvent-cement may be added and the mass reground. When thus treated the solvent-cement will act as an air excluder to prevent oxidation. Second, the old rubber may be partially reduced as above stated with a part of the solvent-cement added, and then reground with the balance of the solvent-cement added. I have found this last method very efficient, apparently for the reason that it acts to carry the new rubber over the surfaces of the old rubber thoroughly and uniformly. The remaining steps are the same in all cases mentioned.

It is distinctly to be understood that after grinding and mixing with the solvent-cement, the solvent must be driven off as nearly entirely as possible; for if it is permitted to remain in any material amount, its presence is evidenced by imperfections in the finished product.

In general manufacture, using the ordinary run of scrap rubber, I have found that I attain the best results by using from two and one-half to three pounds of new, unvulcanized rubber to one hundred pounds of old rubber, and an excess of solvent sufficient to insure thorough wetting of the mass. However, in some old or scrap rubber, the amount of actual rubber and filler may vary materially from the ordinary; and in such case, in carrying out my process, a person skilled in the art will take such variation into account and will use more or less new rubber as the case requires.

Having thus described my invention and the method of employing the same, I claim:

1. The process of treating vulcanized rubber consisting of reducing the same to a finely divided state under conditions of exclusion of oxygen, adding thereto a small quantity of new, unvulcanized rubber sufficient merely to film the particles of old rubber, which new rubber has been dissolved in an excess quantity of solvent sufficient to distribute said new rubber over said particles, driving off said solvent, and forming and vulcanizing in the usual manner.

2. The process of treating vulcanized rubber which consists of comminuting said rubber to expose fresh surfaces and protecting such surfaces from contact with oxygen or other deteriorating substance until the next step, filming said comminuted rubber with new, unvulcanized rubber by dissolving said new rubber in a solvent sufficient in quantity to carry said new rubber over the freshly exposed surfaces of the old rubber, whereby said solvent acts both as a solvent and a carrier and distributer of the new rubber, driving off said solvent, and forming and vulcanizing in the usual manner.

3. The process of treating vulcanized rubber which consists (1) in comminuting the same to expose fresh surfaces and preventing oxidation during and following said step; (2) mixing with such old comminuted rubber new, unvulcanized rubber dissolved in a solvent, the amount of such new rubber being sufficient only to produce a very thin film over said freshly exposed surfaces while the amount of said solvent is in sufficient excess to act as a carrier of the new rubber to said fresh surfaces; (3) eliminating said solvent; (4) forming and vulcanizing the filmed old rubber.

4. The process of treating vulcanized rubber consisting of comminuting the same and protecting the freshly exposed surfaces from deterioration until they are filmed, filming said surfaces with new, unvulcanized rubber in the proportions of from two to five per cent. of new rubber to the old rubber, the new rubber having been dissolved in an excess of solvent to insure substantially complete filming, driving off the solvent, and forming and vulcanizing in the usual manner.

5. The herein described process of treating old rubber which consists in grinding old rubber in the presence of a rubber solvent-cement diluted by excess solvent to carry the new rubber to place about the surfaces of the old rubber particles as they are exposed during grinding, and continuing such grinding or pulverizing process until the old rubber has been reduced approximately to the limit of practical mechanical division, so that the solvent and new rubber penetrates to the limits of such mechanical division, driving off the solvent, and molding and vulcanizing.

JOSEPH PORZEL.